United States Patent
Chalupa et al.

[19]

[11] Patent Number: 6,137,272
[45] Date of Patent: Oct. 24, 2000

[54] METHOD OF OPERATING AN AC-DC CONVERTER

[75] Inventors: Leos Chalupa, Jemnice; Petr Lidak, Hladke Zivotice, both of Czechoslovakia

[73] Assignee: Motorola, Inc., Schaumburg, Ill.

[21] Appl. No.: 09/433,496

[22] Filed: Nov. 3, 1999

[51] Int. Cl.$^7$ .................................................. G05F 1/10
[52] U.S. Cl. ............................................ 323/222; 323/284
[58] Field of Search .................................. 323/222, 284, 323/285, 283; 363/45

[56] References Cited

U.S. PATENT DOCUMENTS

| | | | |
|---|---|---|---|
| 4,761,725 | 8/1988 | Henze | 363/46 |
| 5,747,977 | 5/1998 | Hwang | 323/284 |
| 5,764,024 | 6/1998 | Wilson | 318/805 |
| 5,959,852 | 9/1999 | Deloy et al. | 363/45 |

OTHER PUBLICATIONS

"U. Tietze and Ch. Schenk: 'Halbleiter–Schaltungstechnik', 10th edition, Springer Verlag, Berlin, Heidelberg, New York, ISBN 3–540–56184–6, sections 18.5 to 18.7 on pp. 561–586" The 9th edition of this book was published in English in 1991 under the title "Electronic Circuits, Design and Applications" No month.

*Primary Examiner*—Shawn Riley
*Attorney, Agent, or Firm*—A. Kate Huffman

[57] ABSTRACT

An AC-to-DC-converter (100) for driving a dynamic load (160), such as a motor, has a rectifier bridge (110), a coil (120), and a switch (130) to boost an output capacitor (150) by a coil current I(t). The current (I(t)) has periodical minimum values. The converter (100) is controlled by a monitor (170) and a modulator (180). The monitor (170) monitors the converter output (signal 102) during a predetermined monitoring interval ($t_{M1}$, $t_{M2}$) which is inside a minimum-to-minimum interval of the current (I(t)) and classifies changes (voltage $\Delta V_{OUT}$) and/or current $\Delta I_{OUT}$) into a first case (A) where the change exceeds a predetermined threshold ($\Delta V_{TH}$) and a second case (B) where the change does not exceed the threshold. In order to shape the current (I(t)), in the first case (A), the modulator (180) immediately alters the current (I(t)), and in the second case (B), the modulator (180) alters the current (I(t)) when the current has its next minimum. Optionally, immediate altering can be prevented.

3 Claims, 3 Drawing Sheets

6,137,272

METHOD OF OPERATING AN AC-DC CONVERTER

FIELD OF THE INVENTION

The present invention generally relates to electronic circuits, and, more particularly, relates to an AC-to-DC-converter, and to a method to operate the converter.

BACKGROUND OF THE INVENTION

Converters which convert the alternating current (AC) from the mains (e.g., single-phase 230 volts in Europe) to a direct current (DC) are used in a great variety of applications, for example, such as controlling DC motors for household or industrial use (e.g., in washing machines, refrigerators, dishwashers, industrial machines). Such converters are also known as "Switch Mode Power Supply" (SMPS). Converters can comprise a rectifier bridge and a switch-coil arrangement to periodically boost energy to an output capacitor. Construction and operation are explained, for example, in the following reference: "U. Tietze and Ch. Schenk: Halbleiter-Schaltungstechnik', Zehnte Auflage (10th edition), Springer Verlag, Berlin, Heidelberg, New York, ISBN 3-540-56184-6, sections 18.5 to 18.7 on pages 561–586". The 9th edition of this book was published in English in 1991 under the title "Electronic Circuits, Design and Applications".

Load conditions, such as the amount of electrical energy required by the motor, can vary in a short time, for example, when the motor instantaneously has to increase its mechanical torque. To ensure motor operation, the converter has to supply energy to the motor always within the borders of predetermined minimum and maximum values. Otherwise, converter and/or motor could create a safety hazard. For example, the motor could reverse its rotating sense; or the motor could turn into a generator causing unwanted current backflow into the converter.

Hence, the capacitor must be large enough to forward energy to the motor even if the switch-coil arrangement is—due to feedback time constraints—tenporarily not able to boost the capacitor. The size of the capacitor is, however, an important cost factor and should desirable be kept as small as possible.

There are other requirements to a converter. Since the coil drains current from the mains without following the sine function, distortions can go back to the mains. This is not wanted. If, for example, the converter input is derived from conductor pair in a three-phase supply system (as it is widespread in Europe with three power conductor and a neutral conductor), current imbalance between the conductors can lead to an unwanted current in the neutral conductor. As a consequence, a circuit breaker could open, or iron losses in power transformers at the mains could be increases. Especially the third harmonic (e.g., 150 Hz) or higher harmonics plays an important role. Distortions caused by the converter have to be within the limits given by government regulations, national laws, and international standards.

While for AC motors it is easily possible to compensate power factors (ratio between real power and total apparent power, cos φ by additional capacitors switched to the mains; such an approach is not suitable for DC motors.

It will in explained in the following why converters of the prior art suffer from high distortions, large capacitors, or low power factors. The present invention seeks to provide a converter and a method to operate it which mitigate or disadvantages and limitations of the prior art.

DETAILED DESCRIPTION OF THE PREFERRED EMBODIMENTS

In the following, an expression of the type "$t_X < t_Y$" indicates that a time point $t_X$ occurs earlier than a time point $t_Y$; an expression of the type "$t_Y - t_X$" is used to calculate the duration of a time interval between $t_X$ and $t_Y$.

Figure 1:
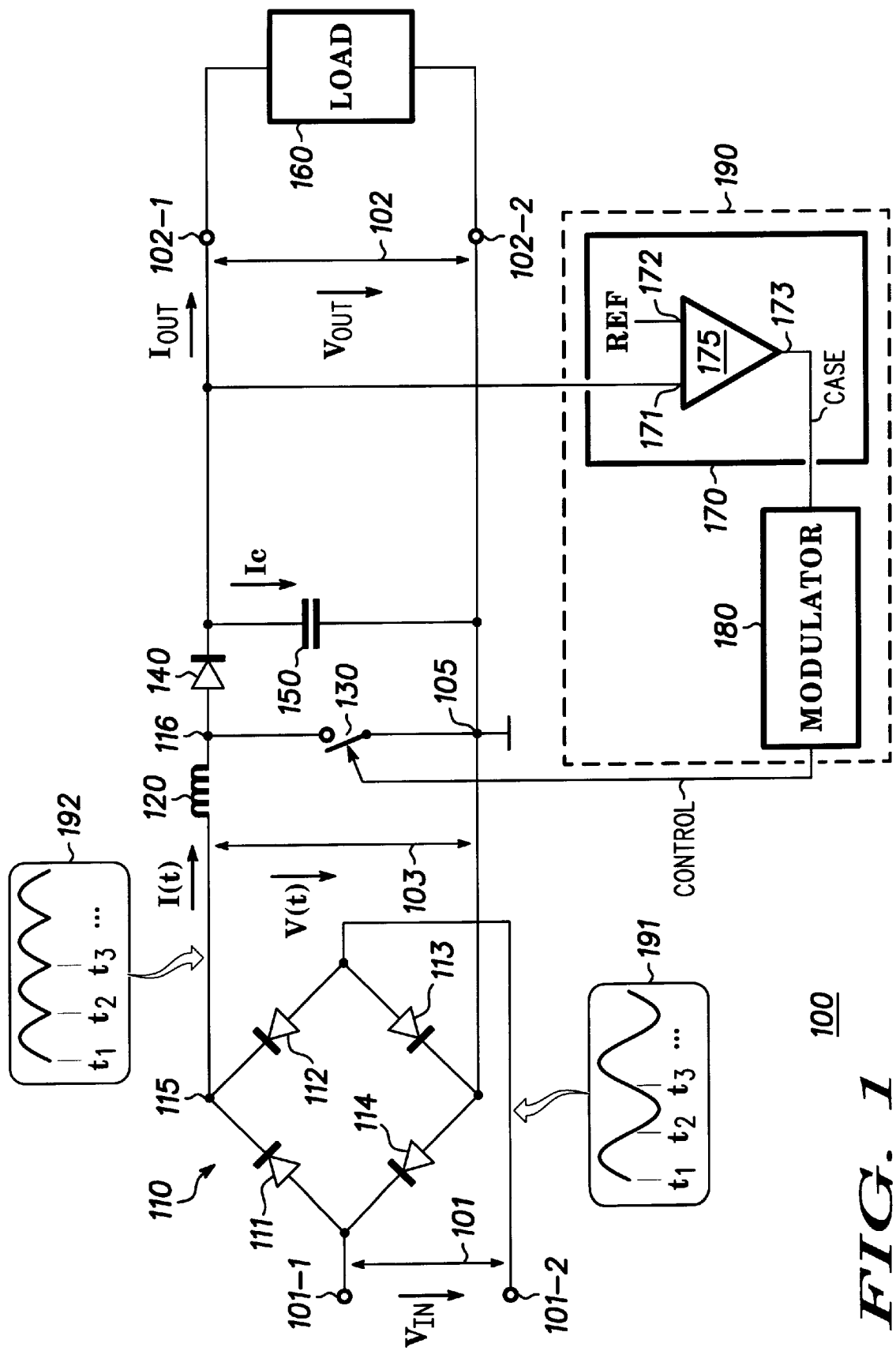
FIG. 1 illustrates a simplified block diagram of an AC-to-DC-converter according to the present invention.

FIG. 1 illustrates a simplified block diagram of AC-to-DC-converter 100 according to the present invention. Unless stated otherwise, voltages are conveniently referred to zero potential at ground 105.

Converter 100 receives AC input signal 101 having, for example in Europe, a rated voltage $V_{IN}$=230 volts (RMS—root mean square) at a rated frequency $f_{IN}$=50 hertz between input terminals 101-1 and 101-2. For convenience of further explanation, simplified time diagram 191 illustrates the sine form of $V_{IN}(t)$ crossing zero ($V_{IN}(t_n)=0$) at time points $t_1$, $t_2$, . . . $t_n$, wherein $t_{n+1} - t_n = \frac{1}{2} f_{IN}$ (i.e., zero every 10 milli seconds).

Converter 100 provides DC output signal 102 having, for example, a rated voltage between $V_{OUT\,RATED}$ and, depending on load 160 (e.g., a motor) a rated current $I_{OUT\,RATED}$ (RMS) between output terminals 102-1 and 102-2 (ground 105). For voltages and currents, minimum (MIN) and maximum (MAX) values can also be defined. Changes within the MIN MAX values are allowed. The internal control of converter 100 accommodates dynamically changing load conditions, such as a sudden increase or decrease of $V_{OUT}$ and/or $I_{OUT}$ without allowing signal 102 to leave its tolerance band.

Preferably, converter 100 comprises rectifier 110 (having diodes 111–114), inductor coil 120, switch 130, diode 140, capacitor 150, output monitor 170 and modulator 180. Preferably, switch 130 is implemented by a power field effect transistor (FET) or other semiconductor switch Persons of skill in the art are able, based on explanation herein, to implement monitor 170 and modulator 180 by analog or digital circuitry. Preferably, monitor 170 and modulator 180 are implemented together by microprocessor 190 (dashed frame). Using the digital approach with microprocessor 190, those of skill in the art can implement converter 100 by using circuitry which is already part of the microprocessor (e.g., registers to store values or instructions) or additional circuitry (analog-to-digital converters to monitor voltages or currents) without the need of further explanation herein. For convenience of explanation, a comparator function in monitor is illustrated in FIG. 1 by comparator 175 (inputs 171 and 172 and output 173).

The elements of converter 100 are, preferably, coupled as follows. In rectifier 110, diodes 111 and 114 are coupled together to input terminal 101-1; diodes 112 and 113 are coupled together to input terminal 101-2; diodes 111 and 112 are coupled together to node 115; and diodes 113 and 114 are coupled together to ground 105. Coil 120 is coupled between nodes 115 and 116; switch 130 is coupled between node 116 and ground 105; diode 140 is coupled between node 116 and output terminal 102-1; and capacitor 150 is coupled between output terminal 102-1 and ground 105. The sense in which the kathodes and anodes of diodes 111–114 and 140 are connected is not important for the present invention and can be changed. Coupling the elements as illustrated in FIG. 1 is intended to serve as a non-limiting example; persons of skill in the art are able to apply the present invention also for other arrangements without departing its scope.

Monitor 170 has comparator input 171 coupled to either one or both output terminals 102-1/102-2, comparator input 172 coupled to receive a reference signal (REF) and comparator output 173 coupled to modulator 180. Modulator 180 has a control connection to switch 130 (signal CONTROL).

Converter 100 operates as follows: Rectifier 110 receives AC input signal 101 (e.g., between anodes of diode pairs 111/114 at input terminal 101-2 and anodes of pairs 112/113 at input terminal 101-2) and provides intermediate signal 103 at node 115 (kathodes of diode pairs 111/112 and 114/113). Switch 130 which is controlled by modulator 180 (signal CONTROL) temporarily enables (when closed) coil 120 to receive energy from intermediate signal 103 from rectifier 110; or enables coil 120 to provide energy (boost) capacitor 150 (when open, via diode 140, charge current $I_C$). Output monitor 170 constantly monitors $V_{OUT}$ and/or $I_{OUT}$ and determines changing output load conditions. FIG. 1 illustrates comparator 175 receiving a representation of output signal 102 and reference signal REF and providing signal CASE (preferably binary) to modulator 180. Signal CASE indicates the magnitude relation of the derivation of signal 102 (i.e. $dV_{OUT}/dt$ and or $dI_{OUT}/dt$) in comparison to the reference REF. Modulator 180 controls switch 130 via control signal CONTROL. Modulator 180 periodically switches switch 130 on (makes switch conductive) and off (makes switch non-conductive) according to predetermined switching patters (preferably, pulse width modulation, for details see TIETZE/SCHENK); and depending on the nature of the changes at the output, modulator 180 changes the switching pattern. In other words, monitor 170 and modulator 180 provide an adaptive feedback. The following explanation refers to intermediate signal 103 which is a power signal. Signal 103 can be measured, for example, as current I(t) between node 115 and coil 120 and as voltage V(t) between node 115 and ground 105. As indicated by simplified time diagram 192, voltage V(t) reaches mimum magnitudes (e.g., zero) at time points $t_1$, $t_2$, ... $t_n$ similar as $V_{IN}(t)$ in diagram 191 (minimum-to-minimum interval). The time functions of voltage V(t) and current I(t) can be described by a series sine function:

$$V(t) = |V_{AMP} * \sin(2 * \pi * f_{IN} * t)| \tag{1a}$$

$$I(t) = \left| \sum_{k=1}^{K} I_{AMP}(k) * \sin(2 * \pi * k * f_{IN} * t) \right| \tag{1b}$$

Symbols | | stand for absolute values (due to rectifying), index k is a counter for harmonics, and $V_{AMP}$ and $I_{AMP}(k)$ stands for amplitudes. While the voltage V(t) follows the base sine function at the input frequency $f_{IN}$, the current I(t) has a base harmonic only in an ideal case.

As mentioned above, due to switching the coil, higher harmonics ($K \geq 2$) in the current I(t) can not be avoided. Modulator 180 provides an approximation of I(t) to the ideal sine shape, or at least an approximation to a shape required by the above mentioned standard. In other words, modulator 180 virtually creates a "resistive" load for signal 103 where current I(t) and voltage V(t) have similar shapes. The degree of approximation depends on cost considerations and on conditions given by the above mentioned standard.

In a first example, input (101) and output (102) signal values are conveniently chosen as: $V_{IN}$=230 volts (RMS), $V_{OUT\ RATED}$=390 volts with an asymmetric tolerance band between $V_{OUT\ MAX}$=400 volts and $V_{OUT\ MIN}$=350 volts; motor output power $P_{OUT}$=1 kilo watt; and capacity C=470 micro farad of capacitor 150.

In preferred embodiments of the present invention, monitor 170 monitors output voltage $V_{OUT}(t)$ (signal 102) at predefined time points tM and distinguishes cases (A) and (B). Persons of skill in the art can apply the following teaching also for monitoring $I_{OUT}(t)$ accordingly.

Figure 2:
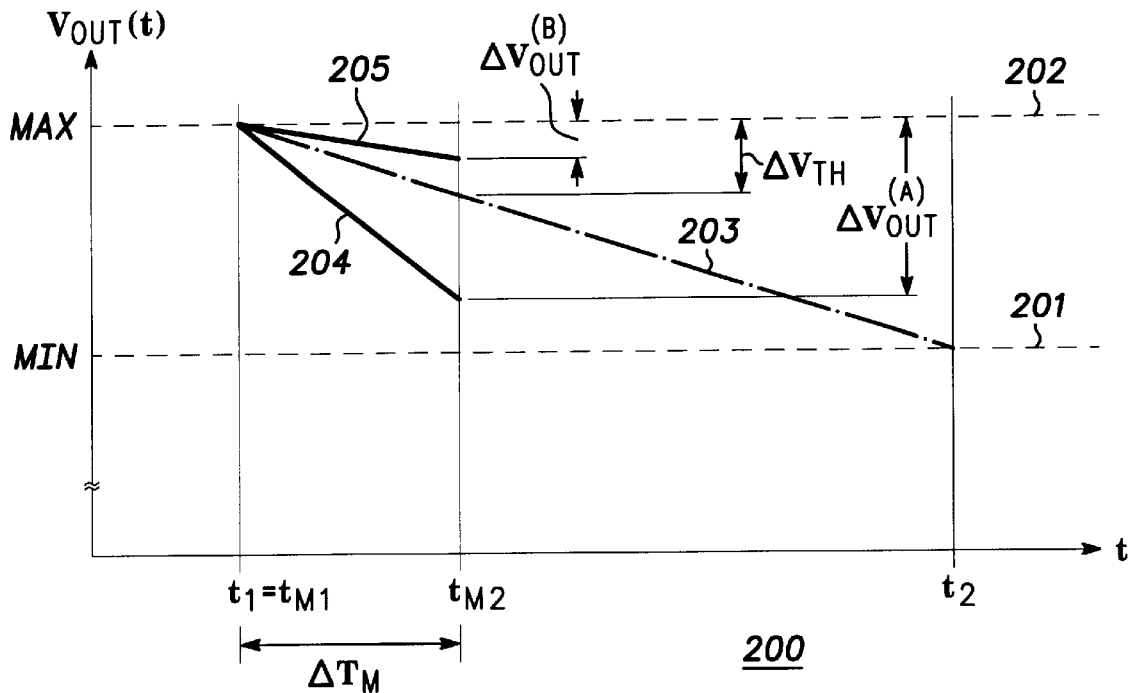
FIG. 2 is a simplified time diagram of an output voltage provided by the converter of FIG. 1.

FIG. 2 is a simplified time diagram 200 of output voltage $V_{OUT}(t)$ provided by converter 100 of FIG. 1. The diagram is useful to explain a possible definition of a threshold voltage difference $\Delta V_{TH}$ (hereinafter "threshold"). The time t is given horizontally with time points $t_1$ and $t_2$ where voltage V(t) of signal 103 has minimum magnitudes (e.g., crosses or reaches zero as defined above) and monitoring time points $t_{M1}$ and $t_{M2}$. In the example of FIG. 2, $t_{M1}$ is coincident with $t_1$. This is convenient for explanation, but not essential for the present invention. Monitoring point $t_{M2}$ should not coincident with $t_2$; preferably, $t_{M2}$ lies within the first half between $t_1$ and $t_2$, that is:

$$(t_{M2} - t_{M1}) < \frac{1}{2} * (t_2 - t_1) \tag{2a}$$

$t_{M1} \geq t_1$ (start of monitoring interval at or after $t_1$) (2b)

$t_{M2} \leq t_2$ (stop of monitoring interval before $t_2$) (2c)

Output voltage $V_{OUT}$ is given vertically. Dashed lines 201 and 202 in parallel to the time axis illustrate the above mentioned tolerance band with minimum (MIN, 201) and maximum (MAX, 202) values for $V_{OUT}$. Dash-point line 203 from position $V_{OUT}(t_1)=V_{OUT\ MAX}$ to position $V_{OUT}(t_2)=V_{OUT\ MIN}$ indicates a possible voltage drop of $V_{OUT}$ still within the allowable tolerance band, where between $t_{M1}$ and $t_{M2}$ ($\Delta T_M = t_{M2} - t_{M1}$), $V_{OUT}(t)$ would fall by threshold $\Delta V_{TH}$.

Straight line 204 shows that (also during $\Delta T_M$) $V_{OUT}(t)$ can fall faster than the voltage of dashed line 203, that is $$\Delta V_{OUT}^{(A)} > \Delta V_{TH} \text{ (case (A) like "ALARM")} \tag{3}$$

In the alternative, straight line 205 shows that (during $\Delta T_M$) $V_{OUT}(t)$ can fall more slowly than (or with equal speed) the voltage of dashed line 203, that is:

$$V_{OUT}^{(B)} \leq \Delta V_{TH} \text{ (case (B))} \tag{4}$$

Hereinafter, voltage changes $\Delta V_{OUT}^{(A)}$ and $\Delta V_{OUT}^{(B)}$ are collectively referred to as "change". Using geometric relations, the threshold $\Delta V_{TH}$ can be calculated by:

$$\Delta V_{TH} = (V_{OUT\ MAX} - V_{OUT\ MIN}) * q \tag{5a}$$

$$\Delta V_{TH} = (V_{OUT\ MAX} - V_{OUT\ MIN}) * \frac{\Delta T_M}{(t_2 - t_1)} \tag{5b}$$

Otherwise expressed, threshold $\Delta V_{TH}$ is conveniently defined as fraction "q" of the voltage difference between the maximum value and the minimum value of the output voltage, wherein the fraction "q" is defined by the ratio between the monitoring interval $\Delta T_M$ and the interval between time points $t_1$ and $t_2$.

For convenience, further monitoring points tM are not indicated in FIG. 2. Although changes $\Delta V_{OUT}$ of $V_{OUT}(t)$ are illustrated as voltage drop, that means negative $\Delta V_{OUT}$, persons of skill in the art can apply the teachings herein also for positive $\Delta V_{OUT}$ (voltage increase) without departing from the scope of the present invention.

Figure 3:
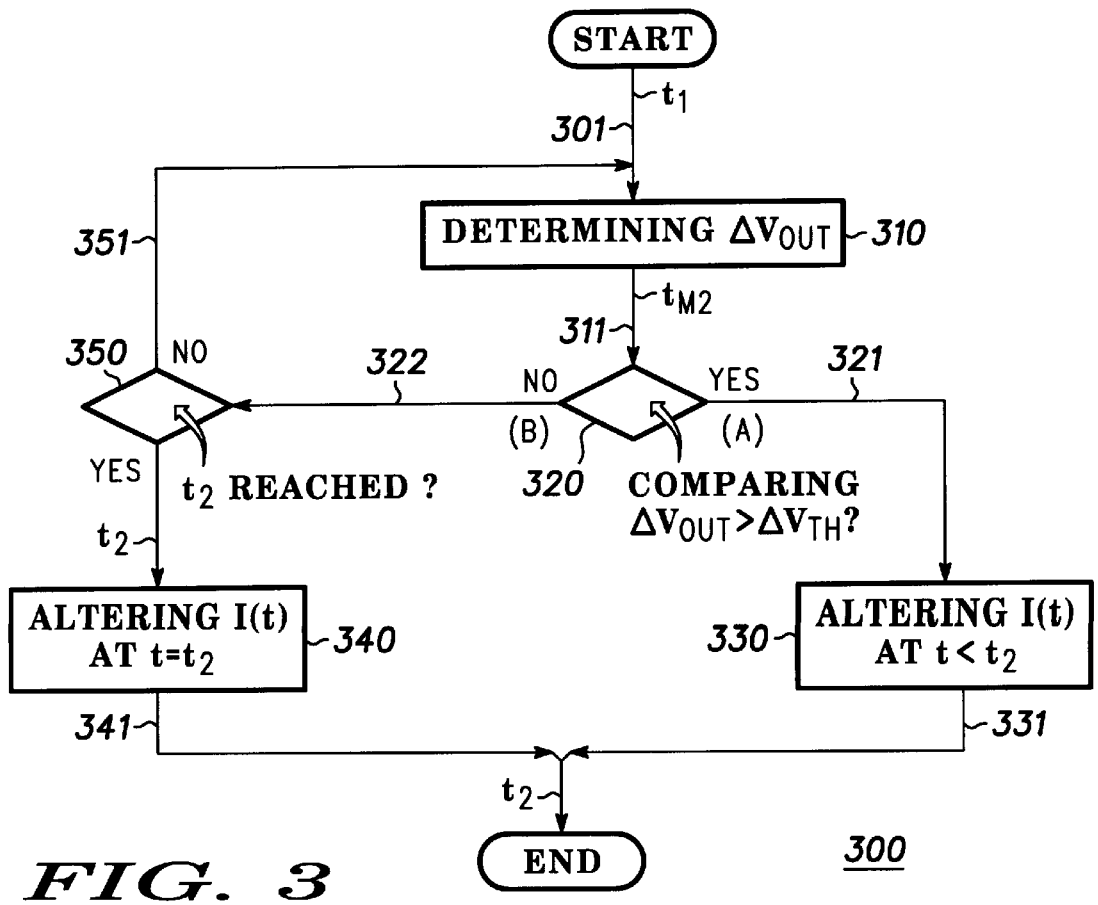
FIG. 3 is a simplified method flow chart diagram of a method for a first embodiment of the present invention.

FIG. 3 is a simplified method flow chart diagram of method 300 of the present invention in a first embodiment of the present invention. In case that monitor 170 and modulator 180 are implemented by microprocessor 190, method 300 illustrates the features of a computer program product to control processor 190. Method 300 describes the operation, for example, for converter 100 as illustrated in FIG. 1 within time points $t_1$ (START, representing $t_n$) and $t_2$ (END, representing $t_{n+1}$). For further cycles, method 300 is repeated (not illustrated for convenience, but illustrated in FIG. 4). Method 300 comprises the steps determining 310, comparing 320, and altering 330 and 340. Checking step 350 and repetition line 351 illustrate that steps determining 310 and comparing 320 can optionally be repeated. Lines 301, 311, 321, 322, 331 and 341 having arrows indicate a preferred method flow. For convenience, time points $t_1$, $t_2$, and $t_{M2}$ can be indicated at some of these lines.

The steps are, preferably, performed in the following order. In determining step 310, monitor 170 monitors output voltage $V_{OUT}(t)$ in the predetermined monitoring interval $\Delta T_M$ (within interval between consecutive first ($t_1$) and second ($t_2$) minimum magnitudes of I(t)) and determines voltage change $\Delta V_{OUT}$. In comparing step 320, monitor 170 compares the voltage change $\Delta V_{OUT}$ to predetermined threshold voltage difference $\Delta V_{TH}$ (see FIG. 1, in general "REF") and communicates the result to modulator 180 (see FIG. 1, "CASE"). In other words, step 320 is a query for "$\Delta V_{OUT} > \Delta V_{TH}$?" with the alternatives YES 321 for case (A) and NO 322 for case (B). Depending on the magnitude relation between the change $\Delta V_{OUT}$ and the threshold $\Delta V_{TH}$, in a first case (A, line 321), modulator 180 immediately alters (step 321) the current I(t) i.e., even if $t_2$ not yet reached); or, in a second case (B, line 322), modulator 180 alters the current I(t) later at the (second) time point $t_2$.

Persons of skill in the art can determine the value by which the current I(t) has to be changed (altered) without the need of detailed explanations herein, for example, by changing the pulse width modulation pattern of switch 130. Neglecting that component of $I_C(t)$ which results from a current flow from coil 120 to capacitor 150, the component of $I_C(t)$ which for a negative change $\Delta V_{OUT}$ (voltage drop) is drained out of capacitor 150 by load 160 can be estimated to have an average value of:

$$|I_C|_{AVERAGE} \approx C * \frac{|\Delta V_{OUT}|}{\Delta T_M} \quad (6)$$

The absolute value symbols indicate that the sign is not considered here for convenience. In short, current I(t) has to be altered by $|I_C|$. In other words, the electrical energy which is additionally required by load 160 has to be supplied to capacitor 150 (for positive $\Delta V_{OUT}$: less energy required). According to the present invention, the time point when the additional energy is provided, depends on the nature of the load condition change. It is understood that the term "altering the current" in step 340 includes cases where an actual change is not required (change by zero).

If in case (B), modulator 180 alters the current I(t) at the end of the interval at $t_2$, then modulator 180 operates like a well-known PI-regulator. If in case (A), modulator 180 alters the current I(t) within the zero-crossing interval $t_1$ to $t_2$, the power factor of converter 100 and load 160 changes too. Occasionally changing the power factor can be accommodated and the influence on the mains can be neglected. To prevent further influence on the power factor, the number of executions of immediately altering step 330 can be limited. This is illustrated in the following.

Figure 4:
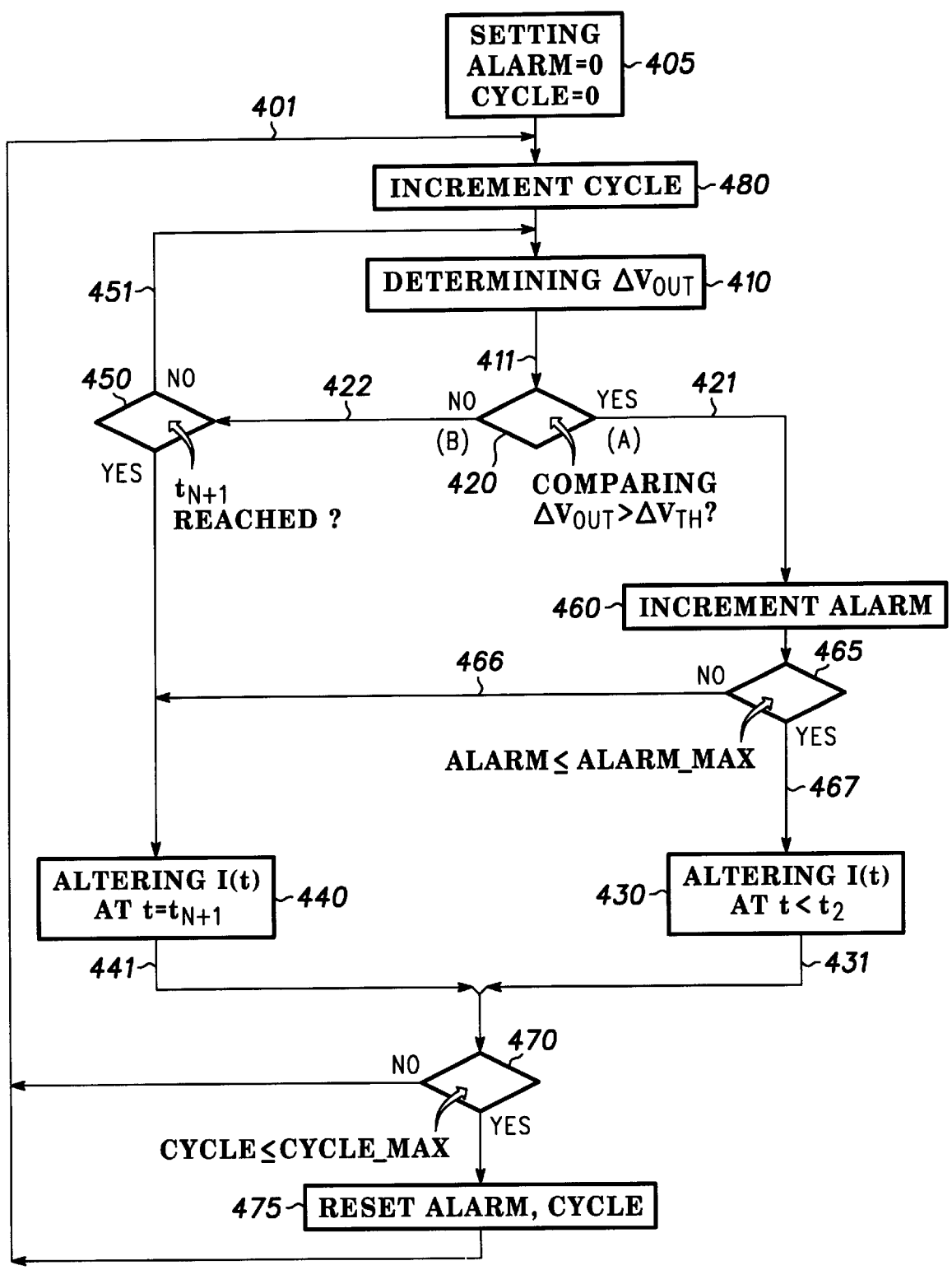
FIG. 4 is a simplified method flow chart diagram of a method for a second embodiment of the present invention.

FIG. 4 is a simplified method flow chart diagram of method 400 of the present invention in a second embodiment of the present invention. Preferably, method 400 is executed by microprocessor 190. In FIGS. 3–4, steps determining 310/410, comparing 320/420, altering 330/430, altering 340/440, and checking 350/450 as well as flow lines 311/411, 321/421, 322/422, 331/431, 341/441, and 351/451 are analogous. Line 401 illustrates the cyclical repetition of these steps for $t_1$, $t_2$, ... $t_n$, $t_{n+1}$, $t_{n+2}$ and so on.

Method 400 further comprises a mechanism (see line 466) which forces processor 190 to execute altering step 440 (at $t_{n+1}$) even if comparing step 420 has led to the result "case (A)". In other words, under predetermined conditions (see checking step 465), the execution of step 440 is mandatory and the execution of step 430 is prohibited. To illustrate this mechanism by way of a non-limiting example, method 400 uses counters CYCLE and ALARM and further comprises (re)setting steps 405 and 475, incrementing steps 480 and 460, as well as query steps 465 and 470. In the example, the number of executions of step 430 is limited to ALARM_MAX within a operation time of CYCLE_MAX cycles (i.e., between $t_n$ and $t_{n+CYCLE\_MAX+1}$) Processor 190 sets ALARM=0 and CYCLE=0 (step 405), increments CYCLE (step 480) for each cycle (see line 401), conditionally increments ALARM in case (A) (line 421, step 460), queries "ALARM≦ALARM_MAX?" (step 465), either executes step 430 (YES, line 467) or executes step 440 (NO, line 466), queries "CYCLE<CYCLE_MAX?" (step 470), and conditionally resets ALARM and CYCLE (YES, step 475). In other words, the number of alarm calls (case A) is limited to a predetermined number (e.g., ALARM_MAX) within a predetermined operation time (e.g., CYCLE_MAX*($t_{n+1}$-$t_n$)) of converter 100.

For example, immediate changes of I(t) are limited to ALARM_MAX=2 during an operation time period of one second (i.e., CYCLE_MAX=100, ($t_{n+1}$-$t_n$)=10 milli seconds)). If, for example, a sudden change of $V_{OUT}$ is detected beginning with $t_1$ (case (A)), then immediate correction by executing step 430 is possible (ALARM=1). If in the next cycle beginning with $t_2$, $V_{OUT}$ is still changing fast (case (A)), an immediate correction by again executing step 440 is still possible (ALARM=2). If however, in the next cycle (starting $t_3$) or in one ore more of the following cycles (e.g., $t_6$), case (A) is detected again, an immediate correction by executing step 430 is prevented (ALARM= 3≧ALARM_MAX). This condition to avoid step 430 is continued until after the mentioned operation period of a second, and CYCLE and ALARM are reset (steps 470, 475). Persons of skill in the art are able to modify method 400 be introducing a different mechanism with departing from the scope of the present invention.

Prior art solutions provide a change of I(t) only according to one of the cases (A) or (B) but do not distinct between the cases. The approach according to the present invention offers advantages over the prior art, such as—a smaller capacitor value, because modulator 180 acts on the changing output load conditions more flexible, the amount of energy to be stored is smaller.

Having described the present invention in great detail, the invention is now summarized for converter 100 comprising the following elements: coil 120 for receiving input power signal 103 derived from an AC source (e.g., from main input 101-1/-2), input power signal 103 periodically having minimum magnitudes (cf. diagram 192); output capacitor 150 for providing a DC output (e.g., signal 102); switch 130 for forwarding input power signal 103 from coil 120 to output capacitor 150; monitor 170 for monitoring the DC output during a predetermined monitoring interval (e.g., $t_{M1}$, $t_{M2}$) inside a minimum-to-minimum interval (e.g., $t_1$, $t_2$) of input power signal 103 and for classifying a change (e.g., $\Delta V_{OUT}$, $\Delta I_{OUT}$) at the output into a first case (A) where the change exceeds a predetermined threshold (e.g., AVTE, AITH) and a second case (B) where the change stays below the threshold; and modulator 180 (controlled by monitor 170) to modulate switch 130, wherein modulator 180 alters a modulation pattern in the first case immediately after the monitoring interval (i.e., after $t_{M2}$, before reaching $t_2$), and wherein modulator 180 alters the modulation pattern in the second case when input power signal 103 has its next mimum (e.g., $t_2$). Optionally, the action of modulator 180 to alter the modulation pattern in the first case immediately after the monitoring interval (case A) can be suspended (see line 466 in method 400) when during a predetermined operation cycle (CYCLE_MAX) the change exceeds the threshold for a predetermined number of times (ALARM_MAX).

Now, methods 300/400 are collectively described as a method for operating a converter (e.g., converter 100) which provides a DC output (e.g., signal 102, represented by $V_{OUT}$ and/or $I_{OUT}$) by temporarily charging an output capacitor (e.g., capacitor 150) with a current (e.g., I(t)), the current being rectified from an AC input (e.g., rectifier 110), the current having consecutively a minimum magnitude at first (e.g., $t_1$) and second (e.g., $t_2$) time points (preferably zero magnitude, see diagram 192 in FIG. 1), the method comprises the steps of:

determining (cf. step 310/410) a change (e.g., $\Delta V_{OUT}$ or $\Delta I_{OUT}$) of the output (e.g., voltage or current) during a monitoring interval (e.g., $t_1$ to $t_2$) which starts at ($t_{M1}=t_1$) or after ($t_{M1}>t_1$) the first time point and which stops before the second time point;

comparing the change to a threshold voltage difference (e.g., $\Delta V_{TH}$ or, accordingly, $\Delta I_{TH}$); and altering the current (i.e. I(t)) immediately after (i.e., at $t_{M2}$) determining the change in case (A) of a first magnitude relation between the change and the threshold, or altering the current at the second time point in case of a second magnitude relation between the change and the threshold.

While the invention has been described in terms of particular structures, devices and methods, those of skill in the art will understand based on the description herein that it is not limited merely to such examples and that the full scope of the invention is properly determined by the claims that follow.

What is claimed is:

1. A method for operating a converter which provides a DC output by temporarily charging an output capacitor with a current, said current being rectified from an AC input, said current having consecutively a minimum magnitude at first and second time points, said method comprising the steps of:

determining a change of said output during a monitoring interval which starts at or after said first time point and which stops before said second time point;

comparing said change to a threshold difference, the threshold difference being defined as a fraction of the difference of a maximum value and a minimum value of said output, and said fraction being defined by a ratio between the monitoring interval and the interval between said first and second time points; and altering the current immediately after determining said change in case of a first magnitude relation between the change and the threshold difference, or altering the current at said second time point in case of a second magnitude relation between the change and the threshold difference, and said first magnitude relation applying when said change is larger than said threshold difference, and said second magnitude relation applying when said change is smaller than or equal to said threshold difference.

2. The method of claim 1 wherein said minimum magnitude of said current at said first and second time points is a zero magnitude.

3. The method of claim 1 wherein said determining, comparing and altering steps are consecutively repeated and wherein the number of consecutive executions of said immediately altering step is limited to a predetermined maximum number of executions within a predetermined number of step repetitions.

* * * * *